United States Patent
Faith et al.

(10) Patent No.: US 8,159,327 B2
(45) Date of Patent: *Apr. 17, 2012

(54) DEVICE INCLUDING AUTHENTICATION GLYPH

(75) Inventors: Patrick Faith, Pleasanton, CA (US);
Ayman Hammad, Pleasanton, CA (US);
Mark Carlson, Half Moon Bay, CA (US)

(73) Assignee: Visa International Service Association, San Francisco, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 12/465,061

(22) Filed: May 13, 2009

(65) Prior Publication Data
US 2010/0117792 A1  May 13, 2010

Related U.S. Application Data

(60) Provisional application No. 61/114,161, filed on Nov. 13, 2008.

(51) Int. Cl.
*H04Q 1/00* (2006.01)
(52) U.S. Cl. ...................................... 340/5.81; 340/5.27
(58) Field of Classification Search .................. 340/7.51, 340/7.55, 5.83, 5.81, 5.27; 382/125, 294, 382/209, 124, 261; 715/784, 786; 345/173, 345/157
See application file for complete search history.

(56) References Cited

U.S. PATENT DOCUMENTS

| | | | |
|---|---|---|---|
| 5,559,961 A | 9/1996 | Blonder | |
| 5,852,775 A | 12/1998 | Hidary | |
| 6,003,326 A | 12/1999 | Hensley | |
| 6,209,104 B1 | 3/2001 | Jalili | |
| 6,317,718 B1 | 11/2001 | Fano | |

(Continued)

FOREIGN PATENT DOCUMENTS

KR  10-2007-0099887 A  10/2007

(Continued)

OTHER PUBLICATIONS

Office Action mailed Aug. 11, 2011 in U.S. Appl. No. 12/472,213, 29 pages.

*Primary Examiner* — Brian Zimmerman
*Assistant Examiner* — Kaleria Knox
(74) *Attorney, Agent, or Firm* — Kilpatrick Townsend & Stockton LLP

(57) ABSTRACT

A device used in an authentication process. The device includes a processor, a display coupled to the processor, and a computer readable medium coupled to the processor. The computer readable medium includes (i) code for displaying a first authentication image including a plurality of image elements including a set of image elements, where the image elements in the set of image elements are located at a first set of positions on a display screen, (ii) code for receiving a first glyph having a first configuration corresponding to the set of image elements from a user while the first authentication image is displayed, (iii) code for displaying a second authentication image including the plurality of image elements including the set of image elements, where the image elements in the set of image elements are located at a second set of positions on the display screen, where the second set of positions is different than the first set of positions, and (iv) code for receiving a second glyph having a second configuration corresponding to the set of image elements from a user while the second authentication image is displayed.

20 Claims, 11 Drawing Sheets

U.S. PATENT DOCUMENTS

| | | |
|---|---|---|
| 6,353,398 B1 | 3/2002 | Amin et al. |
| 6,484,148 B1 | 11/2002 | Boyd |
| 6,571,279 B1 | 5/2003 | Herz et al. |
| 6,575,411 B1 * | 6/2003 | Serizawa et al. ............ 248/49 |
| 6,741,188 B1 | 5/2004 | Miller et al. |
| 6,757,411 B2 | 6/2004 | Chau |
| 6,775,539 B2 | 8/2004 | Deshpande |
| 6,898,301 B2 * | 5/2005 | Iwanaga ............... 382/124 |
| 6,912,398 B1 | 6/2005 | Domnitz |
| 6,993,326 B2 | 1/2006 | Link et al. |
| 7,343,317 B2 | 3/2008 | Jokinen |
| 7,479,949 B2 * | 1/2009 | Jobs et al. ............... 345/173 |
| 7,597,265 B2 * | 10/2009 | Bonalle et al. ............ 235/487 |
| 7,643,685 B2 * | 1/2010 | Miller ............... 382/209 |
| 7,856,603 B2 | 12/2010 | Molgaard |
| 2001/0049636 A1 | 12/2001 | Hudda et al. |
| 2002/0102993 A1 | 8/2002 | Hendrey et al. |
| 2002/0107027 A1 | 8/2002 | O'Neil |
| 2002/0111852 A1 | 8/2002 | Levine |
| 2002/0156677 A1 | 10/2002 | Peters et al. |
| 2003/0006911 A1 | 1/2003 | Smith |
| 2003/0061211 A1 | 3/2003 | Shultz et al. |
| 2003/0126095 A1 | 7/2003 | Allen |
| 2003/0154126 A1 | 8/2003 | Gehlot et al. |
| 2003/0163359 A1 | 8/2003 | Kanesaka |
| 2003/0201500 A1 | 10/2003 | Furnkawa et al. |
| 2003/0210127 A1 * | 11/2003 | Anderson ............ 340/5.27 |
| 2003/0222134 A1 | 12/2003 | Boyd |
| 2004/0093274 A1 | 5/2004 | Vanska et al. |
| 2004/0210500 A1 | 10/2004 | Sobel et al. |
| 2005/0091118 A1 | 4/2005 | Fano |
| 2005/0216337 A1 | 9/2005 | Roberts et al. |
| 2005/0228719 A1 | 10/2005 | Roberts et al. |
| 2006/0004631 A1 | 1/2006 | Roberts et al. |
| 2006/0010231 A1 | 1/2006 | Spector |
| 2006/0074769 A1 | 4/2006 | Looney et al. |
| 2006/0161599 A1 | 7/2006 | Rosen |
| 2007/0050259 A1 | 3/2007 | Wesley |
| 2007/0155402 A1 | 7/2007 | Van Erlach |
| 2007/0162328 A1 | 7/2007 | Reich |
| 2007/0178912 A1 | 8/2007 | Baranowski |
| 2007/0185776 A1 | 8/2007 | Nguyen et al. |
| 2007/0226051 A1 | 9/2007 | Addepalli et al. |
| 2008/0000964 A1 | 1/2008 | Flake et al. |
| 2008/0052168 A1 | 2/2008 | Peters et al. |
| 2008/0059297 A1 | 3/2008 | Vallier et al. |
| 2008/0139112 A1 | 6/2008 | Sampath et al. |
| 2008/0139181 A1 | 6/2008 | Lokshin |
| 2008/0147495 A1 | 6/2008 | Bal et al. |
| 2008/0161018 A1 | 7/2008 | Miller et al. |
| 2008/0201310 A1 | 8/2008 | Fitzpatrick et al. |
| 2008/0201321 A1 | 8/2008 | Fitzpatrick et al. |

FOREIGN PATENT DOCUMENTS

| | | |
|---|---|---|
| KR | 10-2008-0011363 A | 2/2008 |

* cited by examiner

DEVICE INCLUDING AUTHENTICATION GLYPH

CROSS-REFERENCES TO RELATED APPLICATIONS

This application claims priority to and is a non-provisional of U.S. provisional patent application No. 61/114,161, filed on Nov. 13, 2008, which is herein incorporated by reference in its entirety for all purposes.

BACKGROUND

There are a number of ways to authenticate individuals. One method normally used for identifying a user is based on a secret identification code, also referred to as a PIN (Personal Identification Number). In a typical transaction involving a payment card, a user enters his PIN into a transaction terminal, which then communicates with a back end server computer. The back end server computer thereafter verifies that the PIN code is accurate. Although PINs are useful, there are some disadvantages. For example, the owner of the card must memorize the PIN and another person can commit fraud by stealing the PIN.

Another way to authenticate individuals is to use biometrics such as fingerprint readers. Although biometrics can be useful, there are disadvantages. For example, biometric devices are expensive to implement. Further, biometric data can be stolen. For example, fingerprints of individuals can be left on glasses and other objects. Such fingerprints could be replicated by others by creating fake fingerprint impressions. Like a PIN, once biometric data is stolen, it is possible for an unauthorized person to use this data to impersonate a real user.

Static signatures may also be used to authenticate a person. However, a static signature can be forged or electronically intercepted by unauthorized persons.

Embodiments of the invention address these and other problems, individually and collectively.

SUMMARY

Systems and methods for improved methods and devices are disclosed.

One embodiment of the invention is directed to a device comprising a processor, a display coupled to the processor, and a computer readable medium coupled to the processor. The computer readable medium comprises (i) code for displaying a first authentication image comprising a plurality of image elements comprising a set of image elements, where the image elements in the set of image elements are located at a first set of positions on a display screen, (ii) code for receiving a first glyph having a first configuration corresponding to the set of image elements from a user while the first authentication image is displayed, (iii) code for displaying a second authentication image comprising the plurality of image elements comprising the set of image elements, where the image elements in the set of image elements are located at a second set of positions on the display screen, where the second set of positions is different than the first set of positions, and (iv) code for receiving a second glyph having a second configuration corresponding to the set of image elements from a user while the second authentication image is displayed.

Another embodiment of the invention is directed to a method comprising displaying a first authentication image comprising a plurality of image elements comprising a set of image elements. The image elements in the set of image elements are located at a first set of positions on a display screen. The method also includes receiving a first glyph having a first configuration corresponding to the set of image elements from a user while the first authentication image is displayed, and displaying a second authentication image comprising the plurality of image elements comprising the set of image elements. The image elements in the set of image elements are located at a second set of positions on the display screen. The second set of positions is different than the first set of positions. The method further includes receiving a second glyph having a second configuration corresponding to the set of image elements from a user while the second authentication image is displayed.

Another embodiment of the invention is directed to a method comprising displaying a first image element and receiving a glyph. The glyph is created by moving the first image element from a first position relative to a second image element to a second position relative to the second image element. The method also includes sending an authentication message comprising data representing the glyph to a service provider.

Another embodiment of the invention is directed to a device comprising a processor, a display coupled to the processor, and a computer readable medium coupled to the processor. The computer readable medium comprises code for displaying a first image element, receiving a glyph, where the glyph is created by moving the first image element from a first position relative to a second image element to a second position relative to the second image element, and code for sending an authentication message comprising data representing the glyph to a service provider.

Further details regarding embodiments of the invention are provided below in the Detailed Description with reference to the Figures.

DETAILED DESCRIPTION

One embodiment of the invention is directed to a method for authenticating a user (e.g., a consumer) in a transaction such as a payment transaction. Although payment transactions are discussed in detail, it is understood that embodiments of the invention can be used in other transactions such as money transfer transactions or access transactions (e.g., obtaining access to a particular location or venue).

The method comprises, in a first transaction, displaying a first authentication image comprising a plurality of image elements comprising a set of image elements on a display screen on a device such as a personal computer, a mobile phone, or an access device. The display screen can comprise a touch screen. A touch screen can allow a user to input data into the device by contacting the screen with a finger or a stylus. The image elements in the set of image elements are located at a first set of positions on the display screen.

Any suitable type or number of image element can be displayed on the display screen. Suitable image elements may comprise images of two or three dimensional objects, or parts thereof. Examples of two dimensional objects might be simple shapes such as squares or circles, or streets or landmarks on a two-dimensional map. Examples of three-dimensional objects may include pictures of buildings, mountains, rocks, etc.

After the first authentication image is displayed, a first glyph having a first configuration corresponding to the set of image elements is received by the device while the first authentication image is displayed on the display screen. A user may use his finger or a stylus to create a glyph that corresponds to the set of image elements.

As used herein, a "glyph" can be a figure that can be drawn on the display screen using a finger, stylus, cursor, or the like. A mouse or other input device can be used to create a glyph. The glyph and/or the stroke(s) used to form the glyph may be continuous or discontinuous in nature, and they can be simple or complex. An example of a continuous figure can be in the shape of a letter such as the letter "Z," "C," "S," or some other complex or simple shape. An example of discontinuous strokes used in a glyph can be a glyph in the form of the letter "X".

Figure 4A:
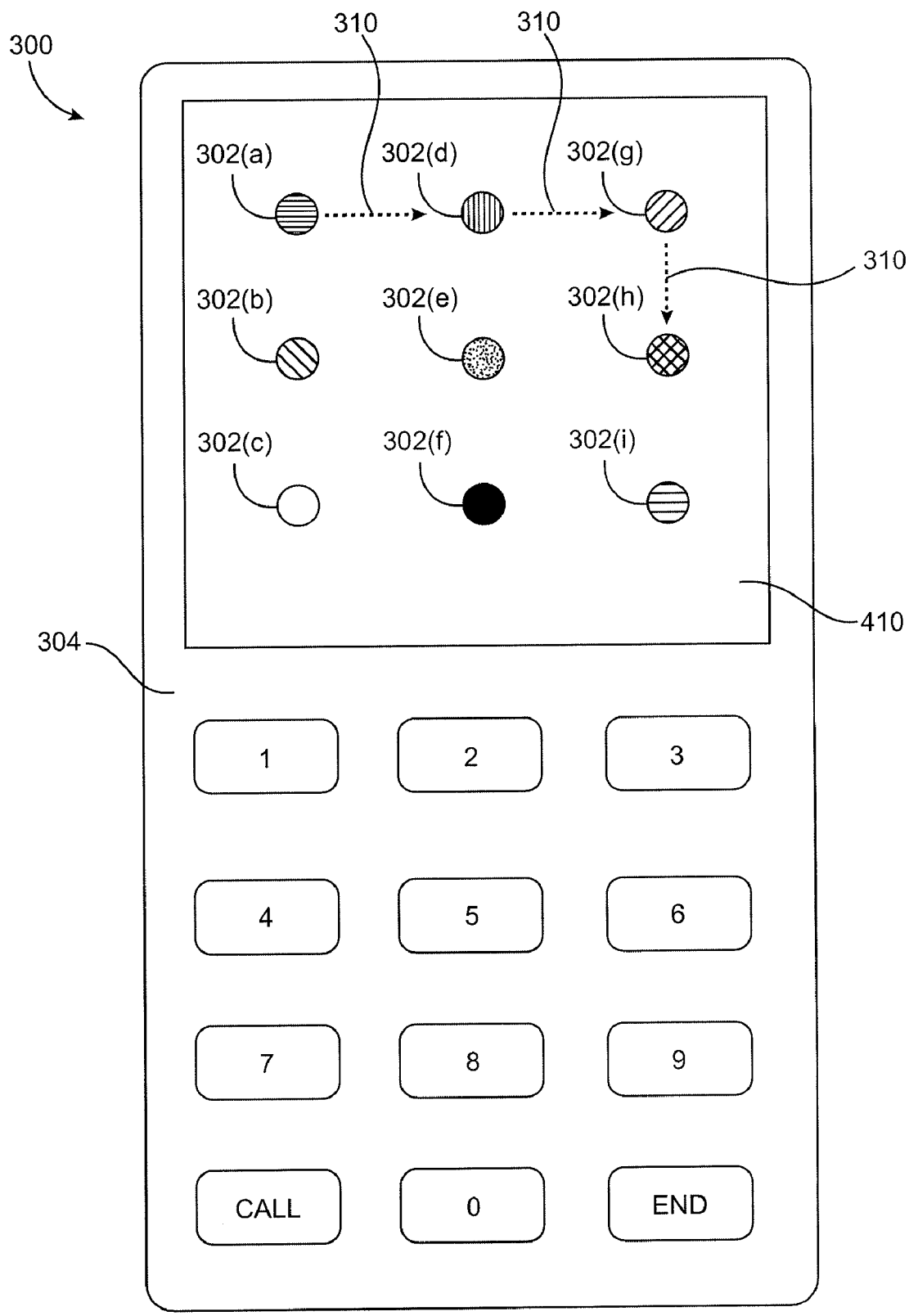
FIGS. 4(a)-4(b) respectively show first and second authentication images on a phone. The authentication images comprise two dimensional image elements.

Illustratively, FIG. 4(a) shows a phone 300 comprising a display screen 410 coupled to a housing 304. The display screen 410 shows a first authentication image comprising first plurality of image elements in the form of an array of differently patterned or colored dots 302(a)-302(i). The user may enter a first glyph into the phone 300 using his finger to sequentially connect dots 302(a), 302(d), 302(g), and 302(h) to form the first glyph 310. The dots 302(a), 302(d), 302(g), and 302(h) can form a set of image elements. The first glyph 310 may or may not be displayed on the display screen 410. If it is not displayed on the display screen 410, then the first glyph 310 would still be received by the phone 300.

After the first glyph is received by the device, the device can have an authentication module (e.g., authentication software) which authenticates the user by comparing the first glyph to a previously registered glyph. In other embodiments, the device may send data representing the entered glyph to a remote server computer. The remote server may have an authentication module (e.g., authentication software) which authenticates the user by comparing the first glyph to a previously registered glyph. In either case, if the first glyph matches a previously registered glyph (which may be stored in a database accessible to the remoter server or which may be stored in the device itself), then the user is authenticated and the user may then be allowed to proceed with the transaction. Conversely, if the first glyph does not match the previously registered glyph, then the user is not authenticated and the user may not be allowed to proceed with the transaction. Alternatively, additional authentication steps may be required before the user can proceed with the transaction. For example, a service provider may request that the user call the service provider and provide additional information (e.g., the user's mother's maiden name) before the transaction can proceed.

At some point in time, the user may then subsequently conduct a second transaction using the device (or a different device). The user may initiate a second transaction. The same or different device that was used to conduct the first transaction may then display a second authentication image. The second authentication image may comprise the plurality of image elements comprising the set of image elements.

In the second authentication image, however, the image elements in the set of image elements are located at a second set of positions on the display screen. The second set of positions is different than the first set of positions.

A second glyph having a second configuration corresponding to the set of image elements is received from a user while the second authentication image is displayed. Because the positions of the image elements that are displayed during the second transaction are different than the positions of the image elements that are displayed during the first transaction, and because the second glyph will correspond to the same set of image elements, the first and second glyphs will have different configurations.

Figure 4B:
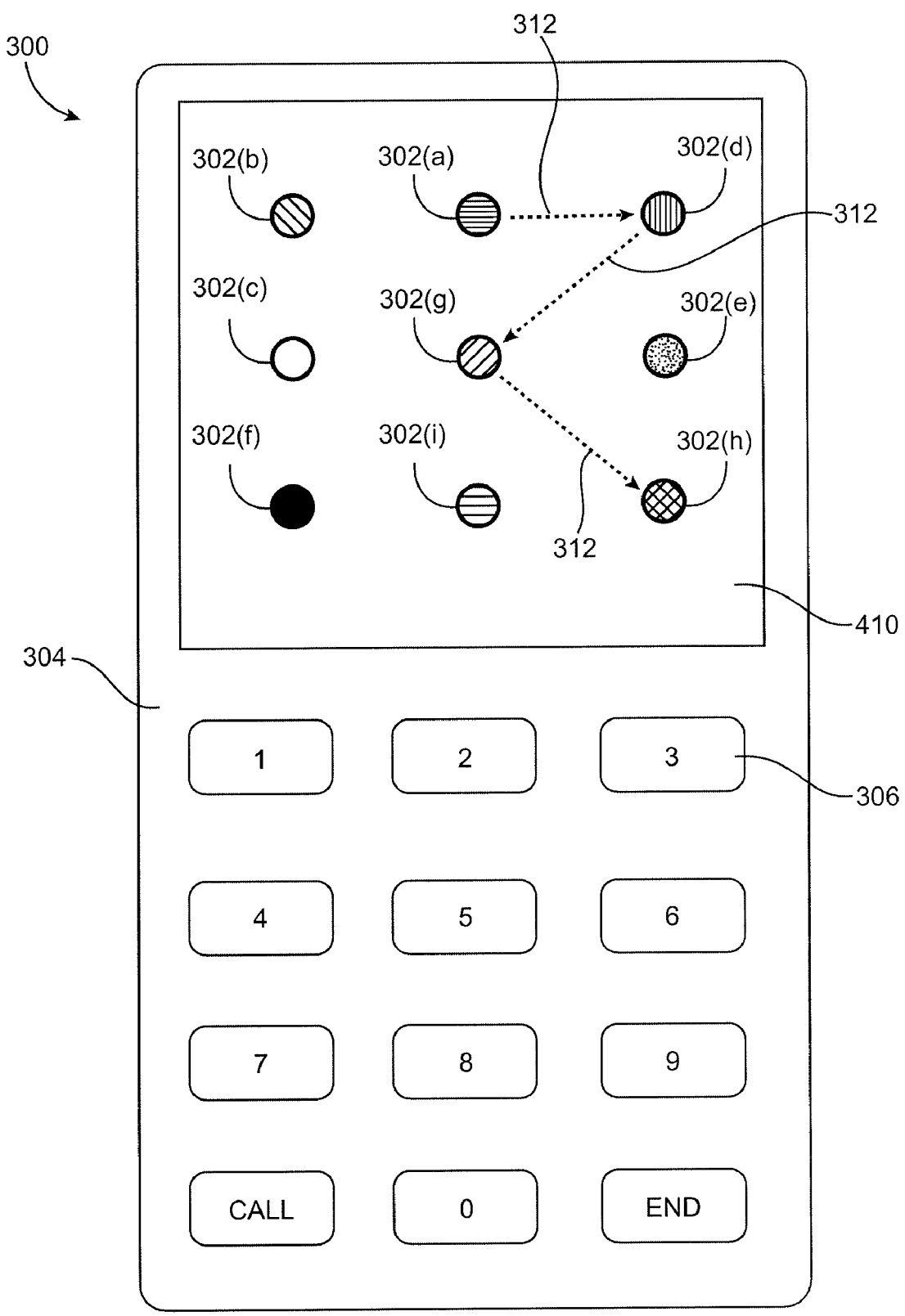

Referring to FIG. 4(b), for example, during the second transaction, the display 410 may display a second authentication image with the same set of dots 302(a)-302(i) as in the first authentication image shown in FIG. 4(a). However, in the second authentication image shown in FIG. 4(a), the dots 302(a), 302(d), 302(g), and 302(h) are at different positions than the positions shown in the first authentication image in FIG. 4(a). The user may enter a second glyph into the phone 300 to connect the dots 302(a), 302(d), 302(g), and 302(h). Because the dots 302(a), 302(d), 302(g), and 302(h) in the second authentication image are at different positions than in the first authentication image, the second glyph 312 has a different configuration than the first glyph 310.

Similar to the authentication of the first glyph, the second glyph is verified for accuracy.

Although first and second glyphs and first and second transactions are discussed herein in the context of two consecutive transactions, it is understood that many more glyphs and transactions can be used in other embodiments of the invention.

The authentication images in FIGS. 4(a) and 4(b) comprise arrays of two dimensional objects such as dots. Other two-dimensional image elements include streets or landmarks in maps, walls of mazes, etc. When successive authentication images are presented to the user in successive transactions, the image elements in those authentication images change positions or change in some other way. For example, different authentication images may be rotated with respect to each other, may have different sizes with respect to each other, may be shifted relative to each other, etc.

Maps can be particularly useful as authentication images. For example, an authentication image may include a map that the user is intimately familiar with. For example, the map may include the user's home location and the user's work location. The user may know his preferred route from home to work, and back to home. This path could form the user's authentication glyph. The orientation of the map (e.g., right-side up, and then up-side down) could change with each transaction, so that the configuration of the entered glyph changes for each transaction. Another example of a useful map may be a map of a recreational site (e.g., an amusement park) that the user frequents. For example, the map may be a map of Disneyland. The user's authentication glyph may be the preferred ride sequence that the user takes through Disneyland.

Embodiments of the invention have a number of advantages. First, because the image elements in the authentication images that are used to authenticate a user during a transaction change, the glyphs that are entered into devices used by a user are constantly changing. Unlike an ordinary signature, this makes it much more difficult for an unauthorized person to replicate, and therefore use in an unauthorized manner. For example, even if an unauthorized person intercepts an electronic signature from a user's phone or computer, the data representing the signature would be of little value. Unlike a static signature, it could not be used again in a subsequent transaction, since the actual glyphs received by the device have different configurations for different authentication images. Second, if a remote server computer changes the authentication images in a predetermined or random way, the unauthorized person would not be able to reproduce the correct glyph, even if the consumer's portable consumer device is stolen. Third, embodiments of the invention have advantages over biometric authentication mechanisms. For example, complex electronics are not required in embodiments of the invention, but are required in biometric authentication mechanisms. Further, with biometrics, once biometric data are stolen, the biometric data can be reused. In contrast, in embodiments of the invention, if a person steals a glyph during a transaction (e.g., by looking at the user while the user creates the glyph), the glyph will not be used to authenticate the user during the next transaction so the stolen glyph is useless.

Figure 1:
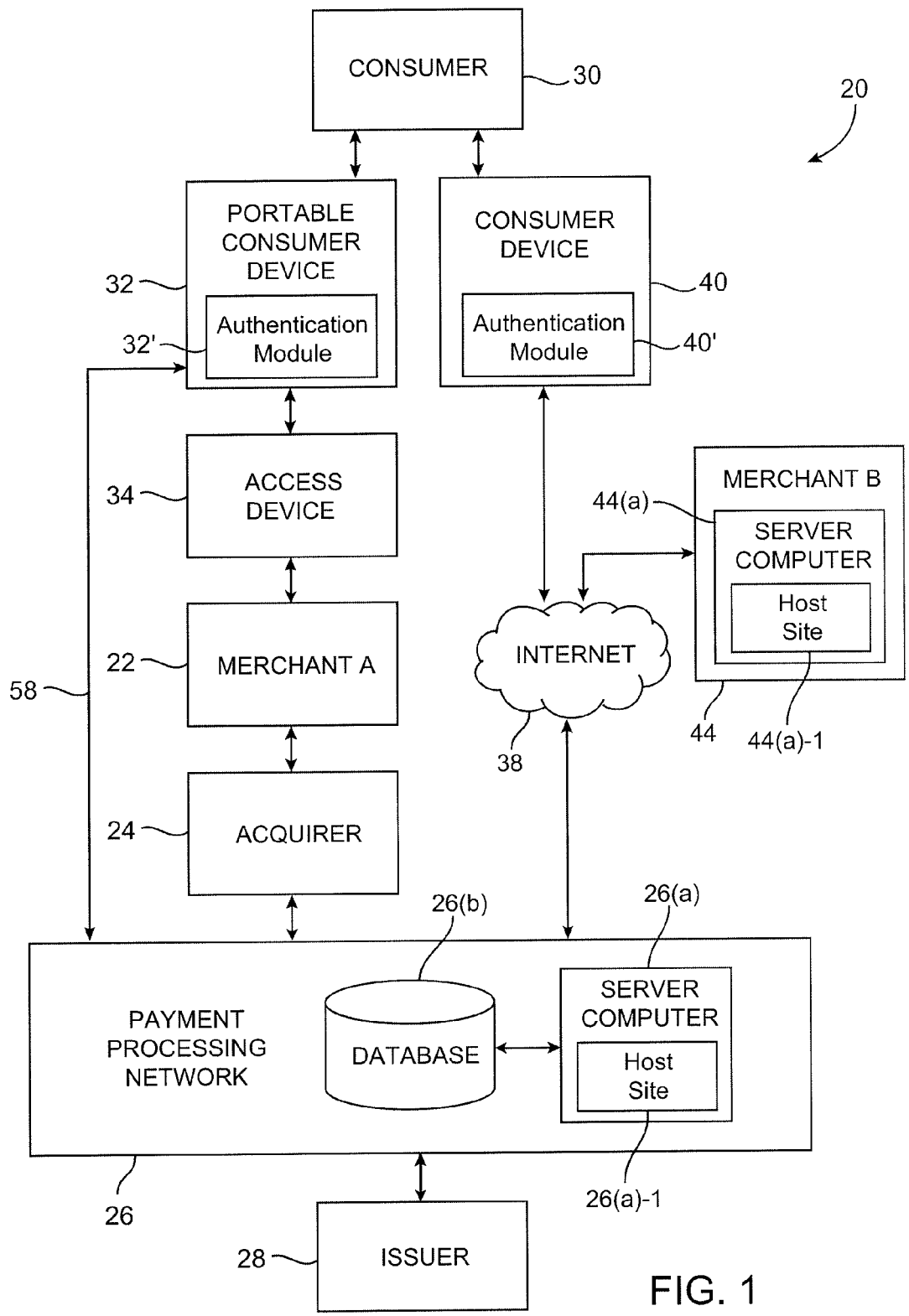
FIG. 1 shows a block diagram of a system according to an embodiment of the invention.
Figure 2:
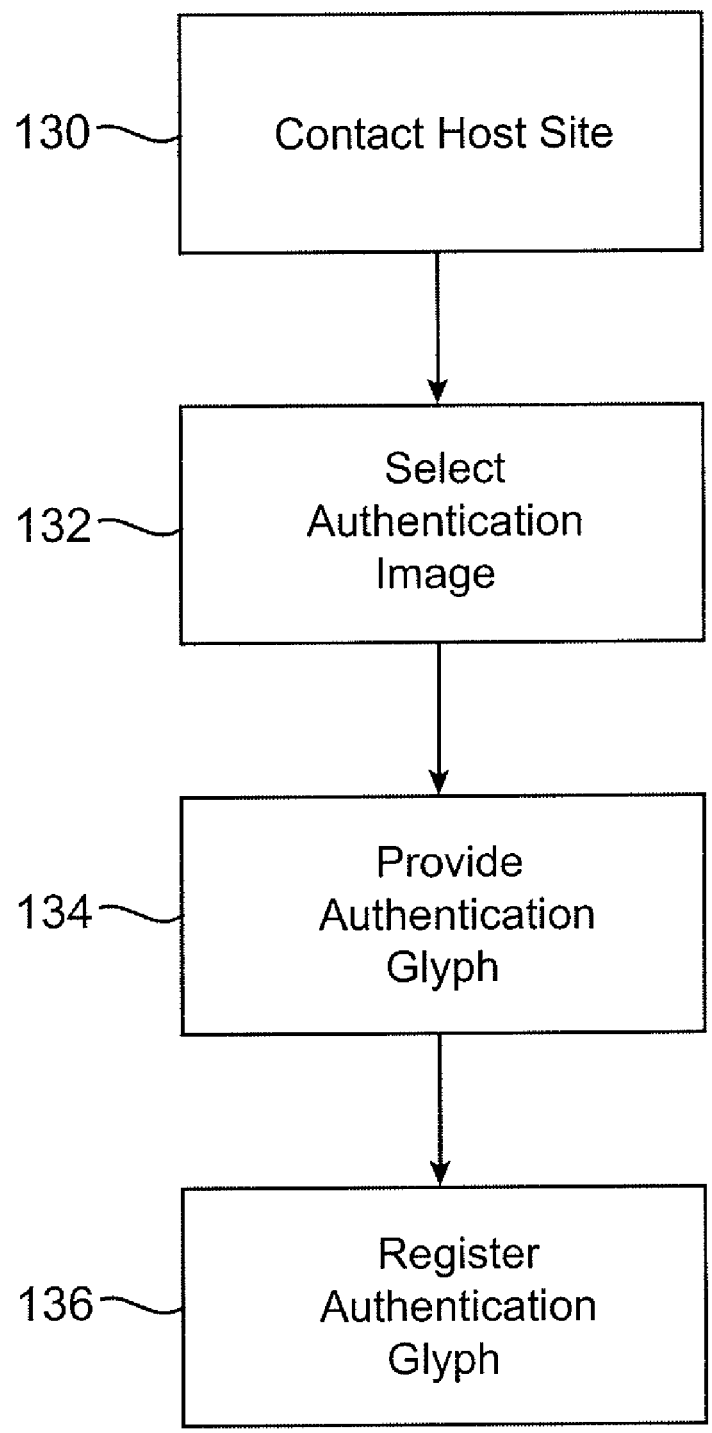
FIG. 2 shows a flowchart illustrating a method for registering an authentication glyph according to an embodiment of the invention.

Specific embodiments of the invention further details regarding embodiments of the invention are provided below. FIG. 1 shows a system which can be used in embodiments of the invention. Note that embodiments of the invention may use all or only some of the components shown in FIG. 1.

Additional embodiments of the invention are discussed in detail below.

I. Systems

FIG. 1 shows a system 20 that can be used in an embodiment of the invention.

The system 20 includes a first merchant ("A") 22 and an acquirer 24 associated with the first merchant 22. The first merchant 22 may be a traditional merchant that the consumer 30 can physically go to conduct a transaction. The first merchant 22 may operate an access device 34, which may be in communication with a payment processing network 26. The payment processing network 26 may be in communication with an issuer 28. The issuer 28 can either issue the portable consumer device 32 or an electronic token (such as an electronic payment card) that is stored in the portable consumer device 32 to the consumer 30.

The system 20 can also include a second merchant ("B") 44, which may communicate with the consumer 30 via the Internet 38. Second merchant B 44 may have a server computer 44(a), which may operate a host site 44(a)-1. The consumer 30 can use a consumer device 40 to conduct transactions with the second merchant 44 by contacting the host site 44(a)-1 via the Internet 38. The consumer device 40 may comprise an authentication module 40'.

Each of the components in FIG. 1 is described in further detail below.

The consumer 30 may be an individual, or an organization such as a business that is capable of purchasing goods or services.

The portable consumer device 32 may be in any suitable form. For example, suitable portable consumer devices can be hand-held and compact so that they can fit into a consumer's wallet and/or pocket (e.g., pocket-sized). Examples of portable consumer devices include cellular phones, personal digital assistants (PDAs), pagers, etc. The portable consumer devices can also be debit, credit, or stored-value devices.

The portable consumer device 32 may comprise an authentication module 32'. It may comprise hardware and/or software for facilitating the authentication process. For example, it may comprise code for storing previously registered authentication glyphs, code for sending a received authentication glyph to a remote server computer, etc.

The consumer device 40 may be a portable consumer device 32. Alternatively, the consumer device 40 can be non-portable in nature. For example, the consumer device 40 could be a kiosk or stand alone computer terminal that is not ordinarily moved. It may also comprise an authentication module 40', which may have similar functions and/or characteristics as the authentication module 30'.

The consumer device 40 or the portable consumer device 32 may comprise a computer readable medium and a display coupled to a processor. The computer readable medium may comprise (i) code for displaying a first authentication image comprising a plurality of image elements comprising a set of image elements, wherein the image elements in the set of image elements are located at a first set of positions on a display screen, (ii) code for receiving a first glyph having a first configuration corresponding to the set of image elements from a user while the first authentication image is displayed, (iii) code for displaying a second authentication image comprising the plurality of image elements comprising the set of image elements, wherein the image elements in the set of image elements are located at a second set of positions on the display screen, wherein the second set of positions is different than the first set of positions, and (iv) code for receiving a second glyph having a second configuration corresponding to the set of image elements from a user while the second authentication image is displayed. It may also have code for providing a first indication that the first glyph is or is not considered authentic, and code for providing a second indication that the second glyph is or is not considered authentic.

In other embodiments of the invention, the consumer device 40 or the portable consumer device 32 may comprise a computer readable medium and a display coupled to a processor. The computer readable medium may comprise code for displaying a first image element, receiving a glyph, wherein the glyph is created by moving the first image element from a first position relative to a second image element to a second position relative to the second image element, and code for sending an authentication message comprising data representing the glyph to a service provider.

The payment processing system 26 may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing system 26 may include a server computer 26(a) operatively coupled to a database 26(b). A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

The server computer 26 may operate a host site 26(a)-1. The host site 26(a)-1 may allow the consumer 30 to select or upload authentication images, and may allow the consumer 30 to manage an account.

The server computer 26(a) may also comprise an authentication module like the authentication module 32' in the portable consumer device 32.

As noted above, the first merchant 22 may also have, or may receive communications from, an access device 34 that can interact with the portable consumer device 32. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including readers such as portable consumer device readers. The card readers may include any suitable contact or contactless mode of operation. For example, exemplary card readers can include RF (radio frequency) antennas, magnetic stripe readers, etc. to interact with the portable consumer devices 32.

In a typical purchase transaction in a portable consumer device-present type of transaction, the consumer 30 purchases a good or service at merchant A 22 using the wireless portable consumer device 32 such as a mobile phone. The consumer's wireless portable consumer device 32 can interact with an access device 34 such as a POS (point of sale) terminal at merchant A 22. For example, the consumer 30 may take a wireless phone and may pass it near a contactless reader in a POS terminal.

An authorization request message is then forwarded to the acquirer 24. After receiving the authorization request message, the authorization request message is then sent to the payment processing system 26. The payment processing system 26 then forwards the authorization request message to the issuer 28 of the portable consumer device 32.

After the issuer 28 receives the authorization request message, the issuer 28 sends an authorization response message back to the payment processing system 26 to indicate whether or not the current transaction is authorized (or not authorized). The transaction processing system 26 then forwards the authorization response message back to the acquirer 24. The acquirer 24 then sends the response message back to merchant A 22.

After the merchant 22 receives the authorization response message, the access device 34 at the merchant 22 may then provide the authorization response message for the consumer 30. The response message may be displayed by the POS terminal, or may be printed out on a receipt.

In an Internet-based type of transaction, the consumer 30 may log onto the merchant's host site 44(a)-1, and may purchase items using the consumer device 44(a), which may be a personal computer with a standard Internet browser and operating system such as a Windows™ based operated system. The server computer 44(a) operated by the merchant 44 may send the authorization request message to the issuer 28 via the payment processing network 26. As in the portable consumer device-present type of transaction, the issuer 28 approves or declines the transaction, and an authorization response message can be sent to the merchant 44, and eventually to the consumer 30 via the consumer device 40.

The authentication processes described herein can be used in both portable consumer device-present types of transactions, as well as Internet based purchasing methods. Glyph authentication processes can be performed using a portable consumer device, consumer device, and access device.

At the end of the day, in both the portable consumer device-present and Internet type of transactions, a normal clearing and settlement process can be conducted by the payment processing system 26. A clearing process is a process of exchanging financial details between an acquirer and an issuer to facilitate posting to a consumer's account and reconciliation of the consumer's settlement position. Clearing and settlement can occur simultaneously.

II. Registration Methods

In some embodiments of the invention, a consumer 30 may register an authentication glyph with a service provider such as an organization that runs a payment processing network 26 or an issuer 28. For example, the consumer 30 may first use the consumer device 40 to contact the host site 26(a)-1 on the server computer 26(a) in the payment processing network 26 (step 130). In other embodiments, the consumer 30 can use the portable consumer device 32 to contact the payment processing network 130 directly (e.g., via communication channel 58).

After contacting the host site 26(a)-1, the consumer 30 can select one or more authentication images. There are a number of ways to select authentication images. For example, when the consumer 30 is logged onto the host site 26(a)-1, the consumer 30 can select an authentication image from a library of authentication images on the host site 26(a)-1. Alternatively, the consumer 30 can upload his own private collection of images to the host site 26(a)-1. For example, the consumer 30 may have a picture, pictures, or video of his favorite mountain at his favorite ski resort and this can be uploaded to the host site 26(a)-1 and may be used as the consumer's authentication image. Such authentication images may be stored in the database 26(b).

If the authentication image is to have a three-dimensional object such as a mountain in it, then the consumer 30 may upload at least two images of the object from different perspectives to the host site 26(a)-1. The at least two images may include first and second authentication images. Alternatively, commercially available digital image rendering software can be used to render any missing parts of a three dimensional object using pictures of various objects taken from different perspectives.

The server computer 26(a) may then send a request message to the user's consumer device 40. The request message may ask that the user draw a glyph corresponding to the selected authentication image. Once the user draws the glyph on the consumer device 40, the glyph may be stored in the database 26(b) by the server computer 26(a). The glyph configuration may have a shape corresponding to the set of image elements in the plurality of image elements. This way, the payment processing network 26 can use the stored authentication image and the corresponding glyph to verify that any future data representing the glyph that is received at the server computer 26(b) are authentic. At this point, the glyph is registered (step 134) and this may be characterized as an "authentication glyph." Each time the set of images objects is presented to the user in a different authentication image, then can be rearranged and the server computer 26(a) can verify the authenticity of a received glyph if it corresponds to the particular set of image elements. The glyph and the authentication image may alternatively or additionally stored in an authentication module 32' in the portable consumer device 32 or in an authentication module 40' in the consumer device 40. If the authentication glyph is stored locally in the portable consumer device 32 or the consumer device 40, the portable consumer device 32 or the consumer device 40 can verify that the received glyphs correspond to the authentication glyph.

III. Authentication Methods

Authentication methods can be described with reference to FIGS. 1, 3, and 5(a) and 5(b).

Figure 3:
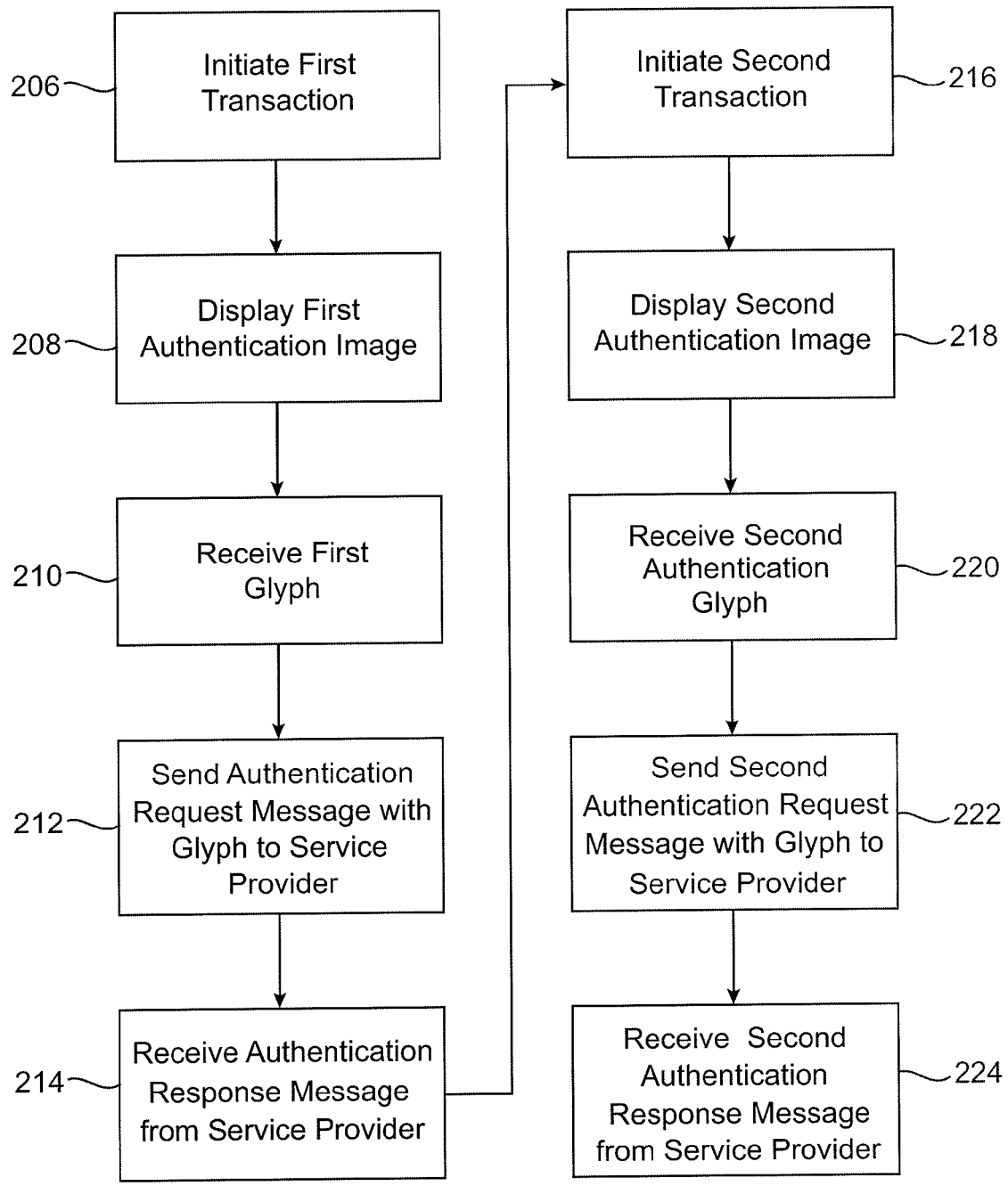
FIG. 3 shows a flowchart illustrating a method according to embodiments of the invention.

Referring to FIGS. 1 and 3, a consumer 30 may first initiate a transaction using the portable consumer device 32 (at step 206). The consumer 30 may be shopping for goods at the merchant A 22 and may place the portable consumer device 32 close to or in contact with the access device 34 during the transaction.

Before or after the portable consumer device 32 is placed close to or in contact with the access device 34, the display screen on the consumer's portable consumer device 32 may display a first authentication image (step 208).

The consumer 30 may then enter a first glyph into the portable consumer device 32 and the portable consumer device 32 may then receive the first glyph (step 210). The consumer 30 may use a stylus or a finger to draw the first glyph on the display screen of the portable consumer device 32.

After receiving the first glyph, the portable consumer device 32 may then send an authentication request message including data representing the glyph to the server computer 26(a). This can be done by communicating directly with the payment processing network 26 (as shown by line 58) using a mobile telephone carrier network or the like. Alternatively, this can be done by sending the authentication request message to the access device 34, which then passes it to the payment processing network 26 via the acquirer 28.

The server computer 26(a) then determines if the received data representing the glyph is authentic by comparing the data to data representing the authentic glyph that is stored in the database 26(b). If the glyphs match or otherwise correspond to each other, then the server computer 26(a) sends an authentication response message back to the portable consumer device 32. This can be done directly through a direct communication channel 58 between the portable consumer device and the payment processing network 26, or through the acquirer 24, merchant 22, and access device 34. If the glyph is determined to be authentic, then the authentication request message may be indicate this and the consumer 30 may proceed with the purchase transaction as described above. If it is not authentic, then the organization that operates the payment processing network 26 can send another authentication request to the consumer 30, or may not allow the consumer 30 to proceed with the transaction.

In other embodiments, an authentication module 32' in the portable consumer device may perform the authentication functions described above.

At some point in time, the consumer 30 could then initiate a second transaction in the same manner with the portable consumer device 32 (step 216). In yet other embodiments, the issuer 28 can perform the functions that the payment processing network 26 are performing.

Before the consumer is allowed to perform the transaction, the portable consumer device 32 may display the second authentication image (step 218). The second authentication image may differ from the first authentication image in any suitable way. For example, the image elements in the first and second authentication images can be rearranged, rotated, etc.

After the second authentication image is displayed, the portable consumer device 32 then receives the second authentication glyph from the consumer 30 (step 220). As noted above, the consumer 30 may use a stylus or a finger to draw the second glyph on the display screen.

The portable consumer device 32 then sends the second authentication glyph to the server computer 26(a) (step 222).

The server computer 26(a) then determines if the received data representing the second glyph is authentic. If it is, then the server computer 26(a) then sends an authentication request message back to the portable consumer device 32, and the portable consumer device 32 receives this message (step 224). If the glyph is determined to be authentic, then the authentication request message may be indicate this and the consumer 30 may proceed with the purchase transaction as described above. If it is not authentic, then the organization that operates the payment processing network 26 can send another authentication request to the consumer 30, or may not allow the consumer 30 to proceed with the transaction.

In some embodiments, a separate authentication request message and authentication response message may not be respectively sent and received. In some embodiments, an authentication request and response may be respectively included in a traditional authorization request message and a traditional authentication response message.

Figure 5A:
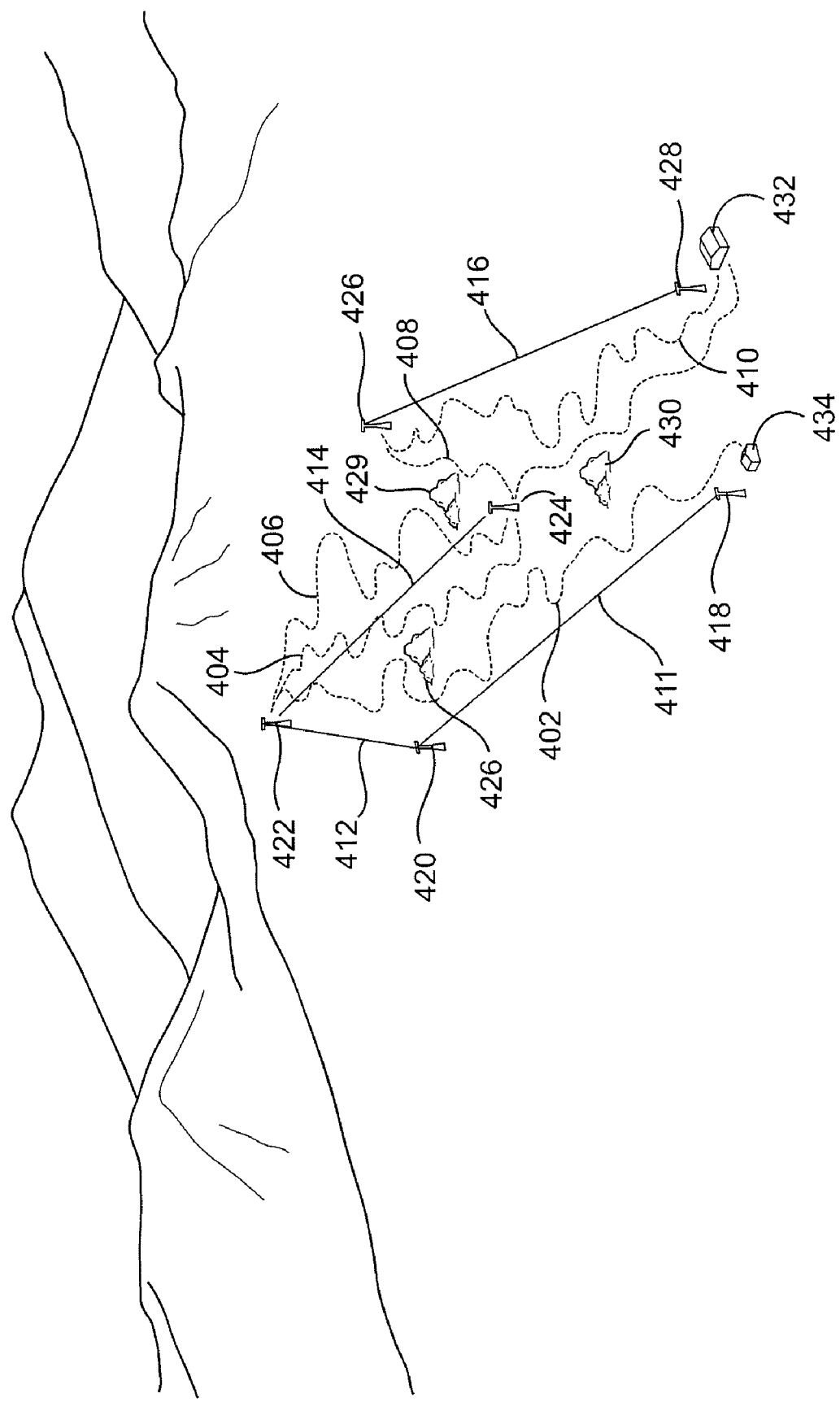
FIGS. 5(a)-5(b) respectively show first and second authentication images with three-dimensional image elements.
Figure 5B:
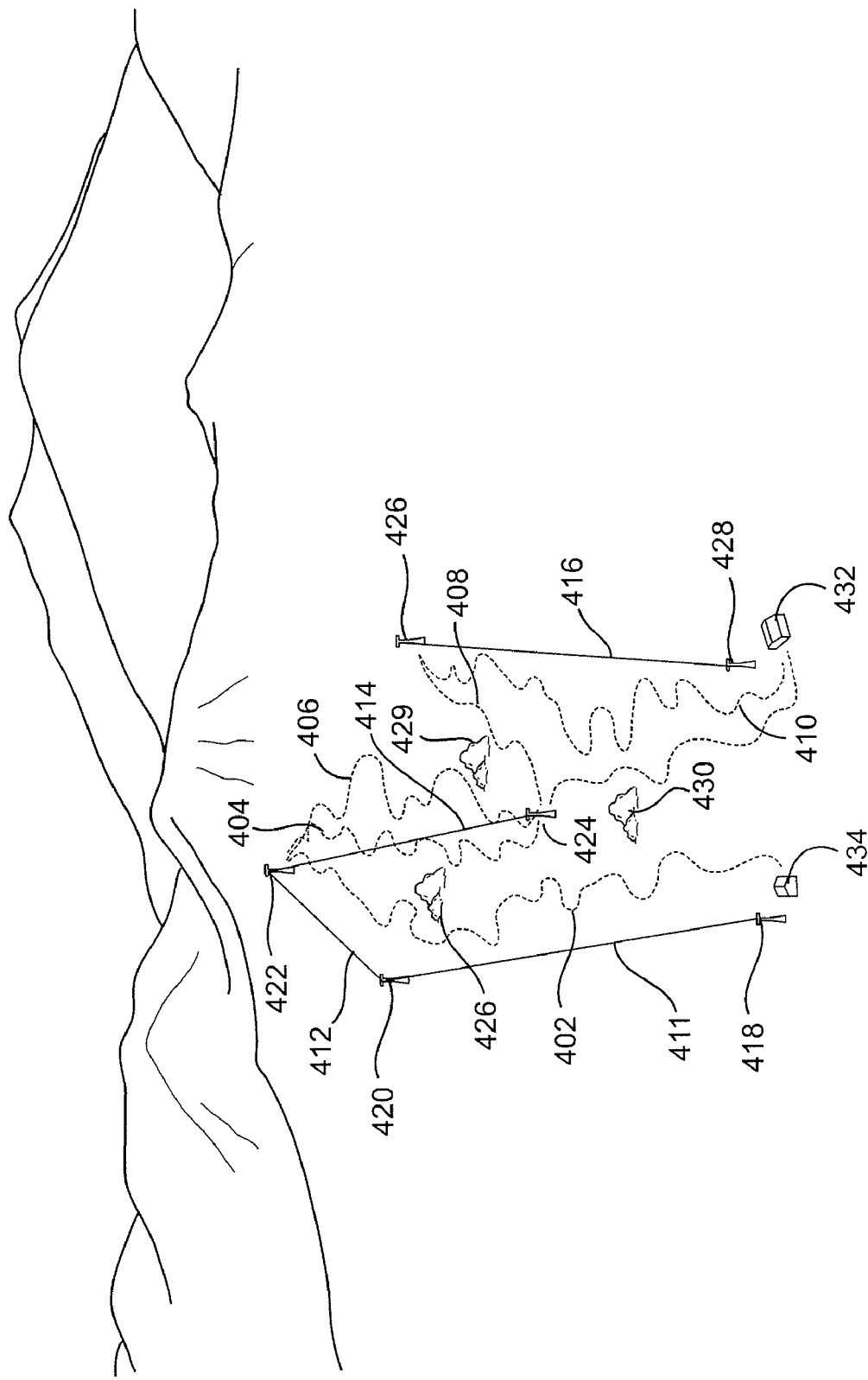

The first and second authentication images in FIGS. 4(a) and 4(b) include images of two-dimensional objects. In other embodiments, the authentication images can include images of three-dimensional objects. This is illustrated in FIGS. 5(a) and 5(b). Compared to glyphs drawn relative to two-dimensional image elements, glyphs drawn on three-dimensional image elements are much harder for an unauthorized person to break, since an additional layer of complexity is provide by the three-dimensional nature of the object depicted.

The first authentication image in FIG. 5(a) shows a ski resort. This authentication image may be displayed on the display screen of the user's portable consumer device when the user conducts a first transaction. The ski resort includes a number of towers 418, 420, 422, 424, 426, 428. Ski lift cables 411, 412, 414, and 416 are strung between pairs of adjacent towers 418, 420, 422, 424, 426, 428. Other objects including rocks 426, 429, 430 and ski lodges 432, 434 are also shown. A number of ski paths 402, 404, 406, 408, 410 are also shown in FIG. 5(a). The various objects (e.g., the slope of the mountain, the rocks, etc.) in FIG. 5(a) can be three-dimensional image elements.

When conducting a first transaction, a user may draw a first glyph relative to the objects in the authentication image shown in FIG. 5(a). The first glyph may represent a preferred ski path typically taken by the user when the user visits the ski resort. For example, the user may typically take the ski lift from tower 418, to tower 420, to tower 422, and then down path 402 to ski lodge 434. The image elements 418, 420, 422, and 434 may be included in a first set of image elements.

When conducting a second transaction, the second authentication image shown in FIG. 5(b) may be displayed on the display on the consumer's portable consumer device. The second authentication image includes the same objects as in the first authentication image shown in FIG. 5(a). However, in FIG. 5(b), the objects are rotated as if the entire mountain is rotated.

The user can then draw a second glyph on the second authentication image shown in FIG. 5(b). The second glyph may be formed when the user takes his finger and draws a line from the ski lift from tower 418, to tower 420, to tower 422, and then down path 402 to ski lodge 434. Because image elements 418, 420, 422, and 434 in the set of image elements in the first authentication image and the second authentication image are in different positions, the first and second glyphs may have different configurations, but may still be used to authenticate the user.

In the examples specifically described above, the authentication glyphs are drawn by a user relative to image elements in the authentication images. In other embodiments, an authentication glyph may include the movement of one image element relative to another image element. The movement thereof may embody an authentication glyph. Thus, another method according to an embodiment of the invention may include displaying a first image element, receiving a glyph, wherein the glyph is created by moving the first image element from a first position relative to a second image element to a second position relative to a second image element, and sending an authentication message comprising data representing the glyph to a service provider.

As used herein, a "service provider" can be any entity that wants to or can authenticate the user or consumer. Examples of service providers include issuers and payment processing organizations.

Figure 6A:
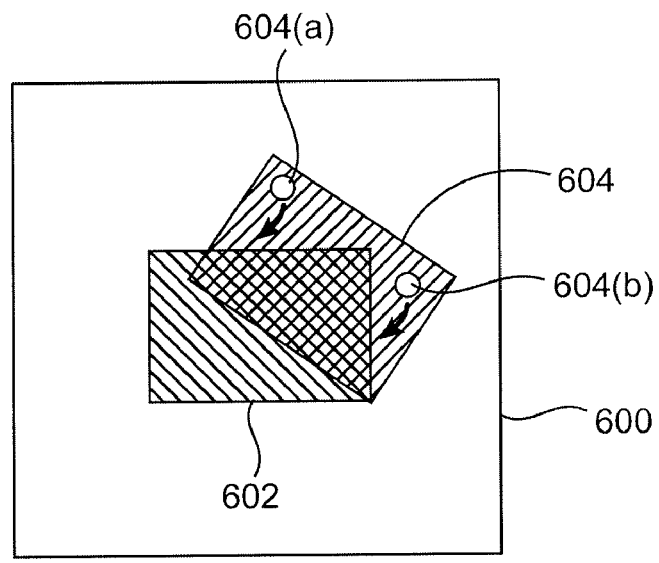
FIG. 6(a)-6(b) respectively show first and second two dimensional image elements that have been manipulated.
Figure 6B:
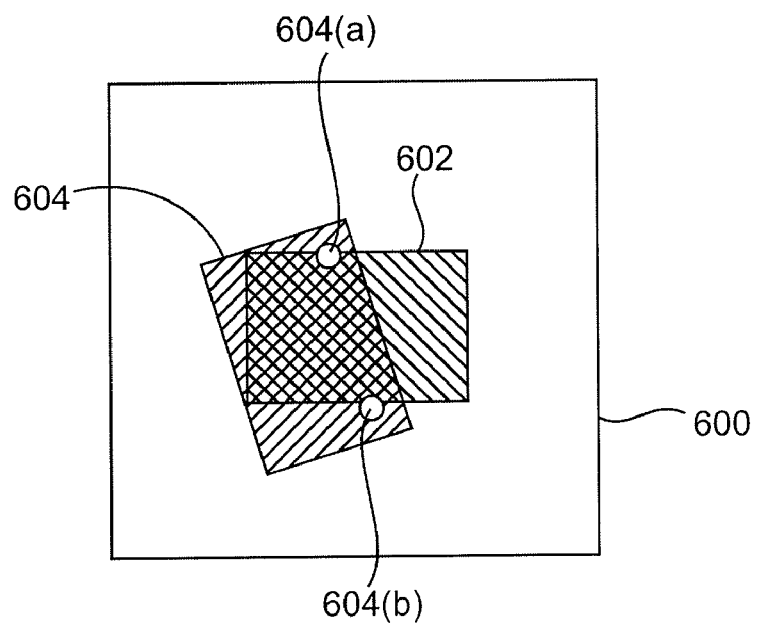

FIGS. 6(a) and 6(b) show two display screens that can be used to illustrate the creation of two glyphs.

In FIG. 6(a), two squares 602, 604 are shown in an overlapping relationship on a display screen. The squares 602, 604 may be different colors. In this embodiment, the user may authenticate himself by putting two fingers on points 604(a), 604(b). The user may move the two fingers, while dragging the square 604 to the position shown in FIG. 6(b). The movement of two fingers across the screen 600 may represent two glyphs that are simultaneously formed. The two glyphs can be used to authenticate the user.

By having the user form at least two glyphs substantially simultaneously, it is possible to increase (e.g., factorially) the user's signature data. In addition to the configuration of the formed glyphs, the curve, velocity, path, etc. can be used to characterize a user's glyph. Any of this information may be previously registered with an appropriate service provider as described above, and stored in an appropriate authentication module.

Figure 7:
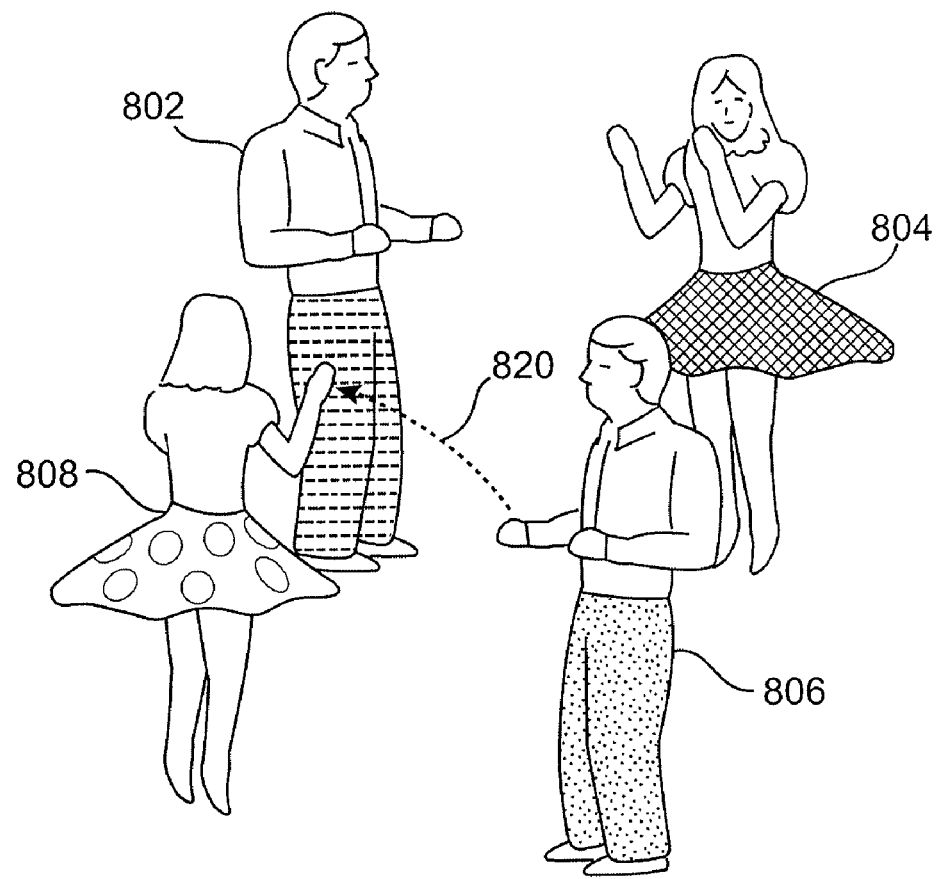
FIG. 7 shows image elements in the form of people.
Figure 7:
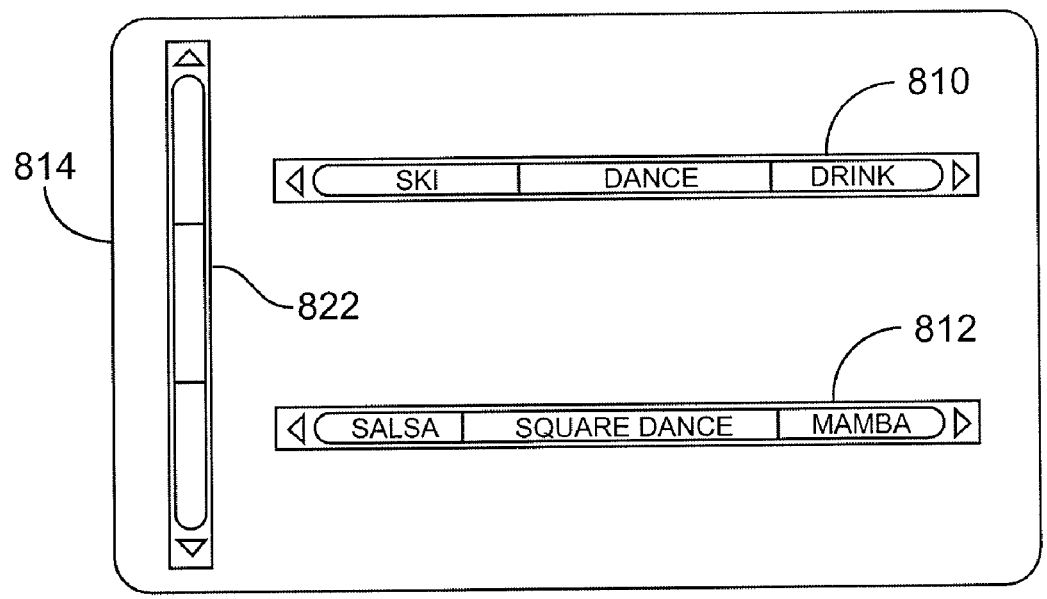

FIG. 7 shows a graphic user interface with a control region and various images of persons (e.g., avatars) 802, 804, 806, 808 that can be manipulated to form glyphs. This can be characterized as an animation builder. A user may pick a scene, and then move around the avatar in that scene.

To form a glyph, the user may touch his finger to the hand of the male 806 and may drag the male 806 by his hand to the hand of the female 808 as shown by arrow 820. The selection of the male 806 and the movement of the male's hand to the female 808 may form a glyph. This glyph may be used to authenticate the user each time the user uses his authenticates himself in a transaction. In this embodiment, the selection of the particular image elements (e.g., the male 806 and the female 808) can form one piece of information that can help authenticate the user. Another piece of information may include the glyph that is formed by moving the hand of the male 806 to the hand of the female 808. The acts of picking image elements and forming a glyph increase the amount of authentication data, thereby making the authentication process secure and reliable.

FIG. 7 also shows a number of scroll bars 810, 812, 822. A user may choose from a variety of different authentication images categories including ski, dance, and drink. There may also be subcategories such as salsa, square dance, and mamba within the authentication image category "dance." A vertical scroll bar 822 can allow one to select categories or subcategories of authentication images.

In embodiments of the invention different types of authentication images may be used in conjunction with different environments. Different types of environments may require different levels of security. For example, if a user is using a home computer, the user may use a first authentication image and a first authentication glyph may be associated with that first authentication image. If the user is using a phone, there is limited visibility, and a second authentication glyph may be associated with the second authentication image. If the user is at a bar, the there is significant visibility, and a third authentication glyph may be associated with the third authentication image. Thus, different channels and/or different environments may use different types of authentication images and authentication glyphs. Thus, embodiments of the invention also include computer readable media comprising code for allowing a user to select different types of authentication images to allow for different environments and/or payment channels. The computer readable medium may reside in the above-described devices, or server computers.

IV. Portable Consumer Devices and Computer Apparatuses

Figure 8:
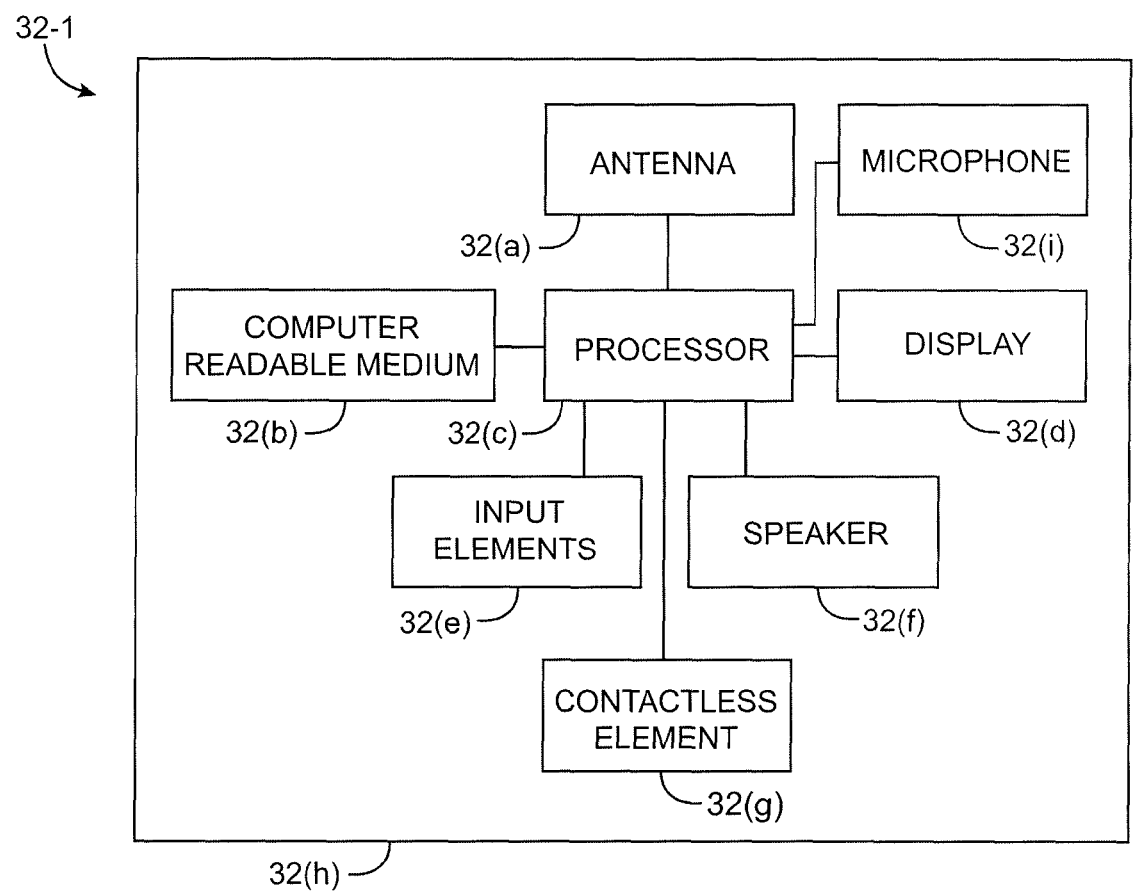
FIG. 8 shows a block diagram of some functional elements in a phone.
Figure 9:
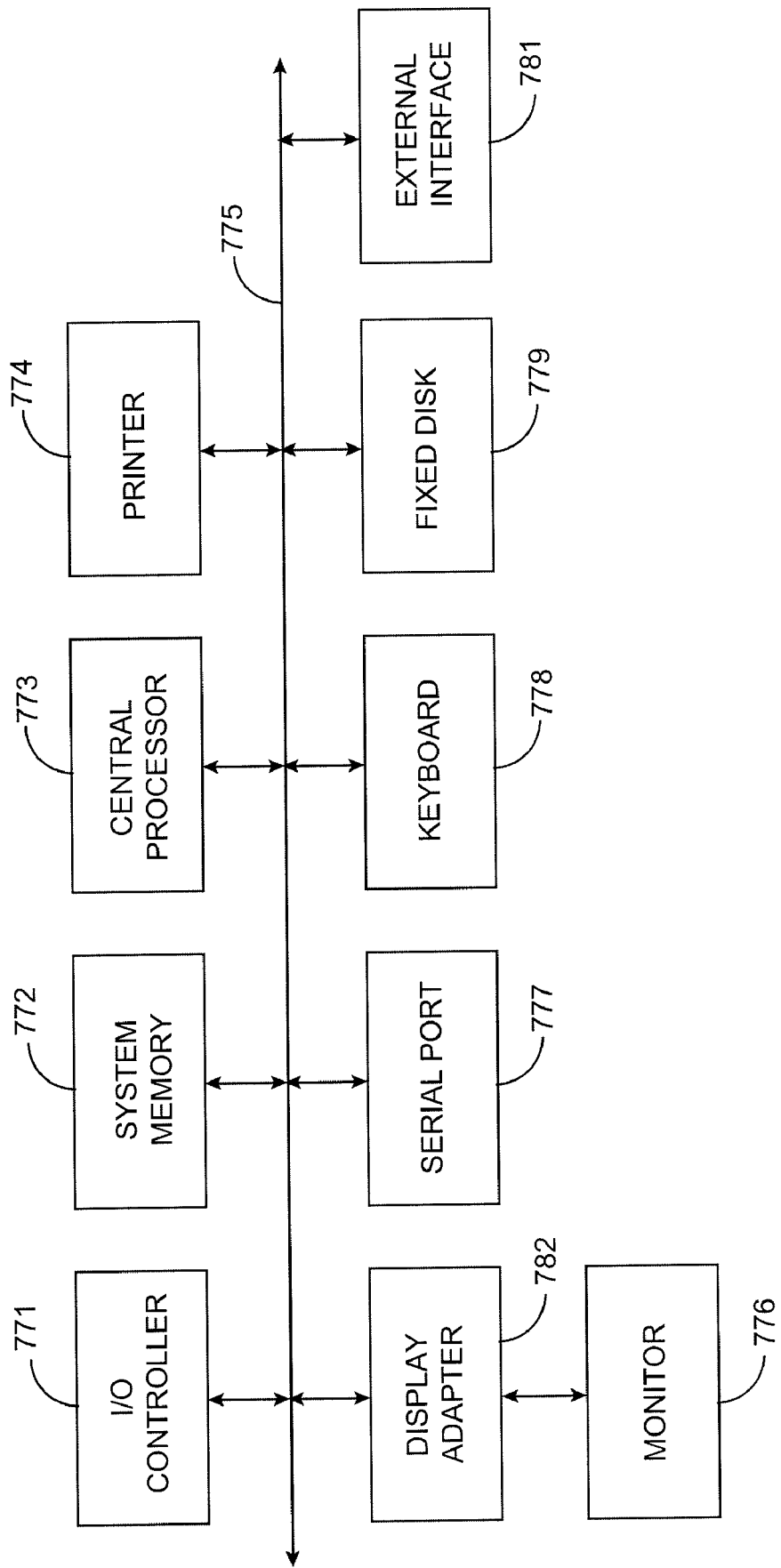
FIG. 9 shows a block diagram of elements in a computer apparatus.

FIGS. 8-9 show block diagrams of portable computer devices and subsystems that may be present in computer apparatuses in systems according to embodiments of the invention.

The portable consumer device 32 may be in any suitable form. For example, suitable portable consumer devices can be hand-held and compact so that they can fit into a consumer's wallet and/or pocket (e.g., pocket-sized). Examples of portable consumer devices include cellular phones (e.g., the phone described above), personal digital assistants (PDAs), pagers, transponders, and the like. The portable consumer devices can also be debit devices, credit devices, or stored value devices.

An exemplary portable consumer device 32' in the form of a phone may comprise a computer readable medium and a body as shown in FIG. 8. (FIG. 8 shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory that stores data and may be in any suitable form including a magnetic stripe, a memory chip, uniquely derived keys (such as those described above), encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 32 may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32 and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32 and an interrogation device. Thus, the portable consumer device 32 is capable of communicating and transferring data and/or control instructions via both cellular network and near field communications capability.

The portable consumer device 32 may also include a processor 32(c) (e.g., a microprocessor) for processing the functions of the portable consumer device 32 and a display 32(d) to allow a consumer to see phone numbers and other information and messages. The portable consumer device 32 may further include input elements 32(e) to allow a consumer to input information into the device, a speaker 32(f) to allow the consumer to hear voice communication, music, etc., and a microphone 32(i) to allow the consumer to transmit her voice through the portable consumer device 32. The portable consumer device 32 may also include an antenna 32(a) for wireless data transfer (e.g., data transmission).

The various participants and elements in FIG. 1 may operate one or more computer apparatuses to facilitate the functions described herein. Any of the elements in FIG. 1 (e.g., the server computers, the consumer device 40, etc.) may use any suitable number of subsystems to facilitate the functions described herein. Examples of such subsystems or components are shown in FIG. 9. The subsystems shown in FIG. 9 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Embodiments of the invention are not limited to the above-described embodiments. For example, although separate functional blocks are shown for an issuer, payment processing system, and acquirer, some entities perform all of these functions and may be included in embodiments of invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A device comprising:
   a processor;
   a display coupled to the processor; and
   a computer readable medium coupled to the processor, the computer readable medium comprising (i) code for displaying a first authentication image comprising a plurality of image elements comprising a set of image elements, wherein the image elements in the set of image elements are located at a first set of positions on a display screen, (ii) code for receiving a first glyph having a first configuration corresponding to the set of image elements from a user while the first authentication image is displayed, (iii) code for displaying a second authentication image comprising the plurality of image elements comprising the set of image elements, wherein the image elements in the set of image elements are located at a second set of positions on the display screen, wherein the second set of positions is different than the first set of positions, and (iv) code for receiving a second glyph having a second configuration corresponding to the set of image elements from a user while the second authentication image is displayed,
   wherein the first glyph and the second glyph are in the form of continuous strokes.

2. The device of claim 1 wherein the device is a personal computer.

3. The device of claim 1 wherein the display comprises a touch screen, which is capable of allowing a user to input data into the device by touching the touch screen with a finger or a stylus.

4. The device of claim 1 wherein the computer readable medium also stores code for at least one account number associated with at least one of a debit card or credit card.

5. The device of claim 1 further comprising:
code for providing a first indication that the first glyph is or is not considered authentic; and
code for providing a second indication that the second glyph is or is not considered authentic.

6. A method comprising:
displaying a first authentication image comprising a plurality of image elements comprising a set of image elements, wherein the image elements in the set of image elements are located at a first set of positions on a display screen;
receiving a first glyph having a first configuration corresponding to the set of image elements from a user while the first authentication image is displayed;
displaying a second authentication image comprising the plurality of image elements comprising the set of image elements, wherein the image elements in the set of image elements are located at a second set of positions on the display screen, wherein the second set of positions is different than the first set of positions; and
receiving a second glyph having a second configuration corresponding to the set of image elements from a user while the second authentication image is displayed,
wherein the first glyph and the second glyph are in the form of continuous strokes.

7. The method of claim 6 wherein the first authentication image is displayed on a personal computer.

8. The method of claim 7 further comprising:
after receiving the first glyph, providing a first indication that the first glyph is or is not considered authentic; and
after receiving the second glyph, providing a second indication that the first glyph is or is not considered authentic.

9. The method of claim 6 further comprising, after receiving the first glyph, sending an authorization request message to a payment processing network or an issuer.

10. The method of claim 6 wherein the first authentication image comprises a three dimensional image element.

11. The method of claim 6 wherein the first authentication image shows a three dimensional object and the second authentication image shows the three dimensional object rotated in three-dimensional space.

12. The method of claim 6 wherein the first authentication image comprises a two dimensional image element at a first position on the display screen, and the second authentication image comprises the two dimensional image at a second position that is a different position on the display screen than the first position.

13. The method of claim 6 wherein the display screen is a touch screen.

14. A device comprising:
a processor;
a display coupled to the processor; and
a computer readable medium coupled to the processor, the computer readable medium comprising code for displaying a first image element, receiving a glyph, wherein the glyph is created by moving the first image element from a first position relative to a second image element to a second position relative to the second image element, and code for sending an authentication message comprising data representing the glyph to a service provider, wherein the glyph is in the form of a continuous stroke.

15. The device of claim 14 wherein moving the first image element from the first position to the second position comprises contacting at least two points on the first image element and then moving at least one of the two contacted points.

16. The device of claim 14 wherein the first image element is in the form of a two dimensional shape.

17. A method comprising:
displaying a first image element;
receiving a glyph, wherein the glyph is created by moving the first image element from a first position relative to a second image element to a second position relative to the second image element; and
sending an authentication message comprising data representing the glyph to a service provider, wherein the glyph is in the form of continuous stroke.

18. The method of claim 17 wherein moving the first image element from the first position to the second position comprises contacting at least two points on the first image element and then moving at least one of the two contacted points.

19. The method of claim 17 wherein the first and second image elements are representations of people.

20. The method of claim 17 wherein the first image element is in the form of a two dimensional shape.

* * * * *